United States Patent [19]
Calta et al.

[11] Patent Number: 5,634,007
[45] Date of Patent: May 27, 1997

[54] INDEPENDENT COMPUTER STORAGE ADDRESSING IN INPUT/OUTPUT TRANSFERS

[75] Inventors: Salvatore A. Calta, Highland; Robert B. Cook, Poughkeepsie, both of N.Y.; Fernando A. Luiz, Moute Sereno, Calif.; Gregory M. Nordstrom, Oronoco, Minn.; Martin W. Sachs, Westport, Conn.; Caryl A. Thorn, Rochester, Minn.

[73] Assignee: International Business Machines Corporation, Armonk, N.Y.

[21] Appl. No.: 398,053

[22] Filed: Mar. 2, 1995

Related U.S. Application Data

[63] Continuation of Ser. No. 843,750, Feb. 28, 1992, abandoned.
[51] Int. Cl.⁶ .......................... G06F 13/28; G06F 12/06
[52] U.S. Cl. ............... 395/200.07; 395/846; 395/418
[58] Field of Search .................... 395/200.07, 418, 395/421.1

[56] References Cited

U.S. PATENT DOCUMENTS

| | | | |
|---|---|---|---|
| 4,481,578 | 11/1984 | Hughes et al. | 395/200.07 |
| 4,495,575 | 1/1985 | Eguchi | 395/846 |
| 4,556,974 | 12/1985 | Kozlik | 370/85.4 |
| 4,641,237 | 2/1987 | Yabushita et al. | 395/299 |
| 4,779,092 | 10/1988 | Takao | 340/825.52 |
| 4,792,947 | 12/1988 | Takiyasu et al. | 370/85.5 |
| 4,807,109 | 2/1989 | Farrell et al. | 395/325 |
| 4,866,421 | 9/1989 | Szczepanek | 340/825.52 |
| 4,937,737 | 6/1990 | Schwane et al. | 395/650 |

OTHER PUBLICATIONS

"Multibus II—an architecture for 32-bit systems", J. Deaston, Electronic Engineering, Mar. 1984, pp. 47–51.
IBM Technical Disclosure Bulletin vo. 27, No. 7A, Dec. 1984 *Use of Request Tokens to Eliminate Address Dependencies on DMA Storage to Storage Transfers.*

*Primary Examiner*—Eddie P. Chan
*Assistant Examiner*—Reginald G. Bragdon
*Attorney, Agent, or Firm*—Paul L. Sjoquist; Karuna Ojanen

[57] ABSTRACT

A method and apparatus for performing direct memory address (DMA) operations between a requestor and responder device by prestoring, for each device, a logical token and offset value which is recognizable by the device as an indicia to identify one or more local memory addresses within the device, and initiating a DMA operation within the requestor device by the requestor device transferring the token and offset value to the responder device, the responder device identifying a responder device local memory address by translation of the token and offset value, and the responder device accessing the identified responder local memory address for data transfer, associated with the token and offset, and the requestor device identifying a requestor device local memory address for completing the data transfer.

20 Claims, 5 Drawing Sheets

INDEPENDENT COMPUTER STORAGE ADDRESSING IN INPUT/OUTPUT TRANSFERS

This is a continuation of U.S. application Ser. No. 07/843,750, filed Feb. 28, 1992, now abandoned.

BACKGROUND OF THE INVENTION

The present invention relates generally to techniques for addressing computer memory storage cells. More particularly, the invention relates to memory storage addressing, in direct memory access (DMA) operations wherein a plurality of computer processors or other devices may be connected to a single data bus or Input/Output (I/O) channel, and wherein one processor may directly access the storage media of another processor for transfer of data over the bus. The present invention may also be employed in other protocols and interconnection media such as those for serial, fiber-optic interconnection media, both shared and switched, to impart the general advantages of DMA mechanisms to these media. In the context of the present disclosure it is to be understood that terms such as "DMA," "DMA bus" and "communication bus" refer to both prior art DMA systems and all other applicable protocols and media.

The features of the invention relate generally to the implementation of storage reference and data description protocols on a shared medium, such as a data bus or channel, for the interconnection of processing and peripheral device elements. More specifically, the invention describes an improved method of specifying storage buffers by one such element to the storage of another, target element.

The invention eliminates one of the prior art difficulties with DMA, i.e., dependencies on the storage architecture of those elements performing DMA operations, while preserving the benefits of the DMA concepts in general.

Direct memory access (DMA) protocols are well known in the prior art, and are characterized by the presence of a DMA "port" facility which directly references the storage of one or both of two communicating elements, as a part of the normal operating protocols of the interconnection medium between these elements, to effect the transfer of a portion of data from one element to the other. The DMA "port" facility may be a component of one or both communicating elements, or may be a distinct third entity which may concurrently reference the storage of one or both elements. A primary characteristic in the prior art is that the DMA "port" facility uses real storage addresses defined within the scope of one or both elements. This has the consequence that the DMA "port" facility must be implemented and specifically adapted to the storage architectures of the elements whose storage it references. This limitation introduces the need for that entity which manages the operation of a DMA "port" to have explicit knowledge of the physical organization of data in those elements referenced by that DMA "port."

An additional characteristic of the prior art is that the specification of the storage location of data within one or both communicating elements must be synchronous with respect to the transfer of data over the interconnection medium associated with the storage locations. This becomes a disadvantage whenever there is a latency period between the data specification and the data transfer phases of the DMA operation, because this produces an idle period on the interconnection medium that reduces its utilization during the DMA operation, and in the fact that other elements sharing the interconnection medium may not utilize the medium during the latency period. This latency results as a consequence of the internal processing and storage access delays during the data specification phase at the target element, or as a result of propagation delays of data specification or data itself on the interconnection medium. The latter delay is particularly significant in high band-width, serial fiber-optic interconnection mediums, in which long distances between elements are possible and which lead to propagation latencies on the interconnection medium that are very large with respect to the signaling frequency of the medium.

The present invention alleviates the disadvantages in the prior art, by providing an alternate technique of data specification in which the DMA "port" facility does not require explicit knowledge of either the storage architecture or the data organization within the target element of a DMA operation. Secondly, the present invention describes the data specification and data transfer phases of the DMA operation such that each may proceed as a discrete operation on the interconnection medium, asynchronous to the other. This asynchronism allows higher utilization of the interconnection medium both by permitting other elements to communicate during the latency period between the data specification and data transfer phases, and by allowing the communicating elements to interleave multiple data specification and data transfer phases.

SUMMARY OF THE INVENTION

The present invention provides a method for selection and transfer of data over a DMA communication bus or I/O channel wherein neither the requesting device nor the responding device have specific knowledge of the other device's actual source or destination addresses of the data to be transferred. The requesting device constructs an indirect addressing reference which will herein be referred to as a "data token," and transfers the data token to the responding device. The responding device converts the data token to one or more actual storage addresses or sets of storage addresses within the responding device, and the DMA operation proceeds within the responding device with reference to the local actual storage addresses. The requesting device likewise constructs actual storage addresses or sets of storage addresses within its storage corresponding to the data tokens, and utilizes these actual addresses to perform the storage references requested by the DMA operation. Therefore, the DMA operation proceeds by reference to data tokens rather than by reference to actual storage addresses or sets of storage addresses. Furthermore, the use of data tokens enables the DMA operation to proceed continuously, intermittently, or sequentially interleaved with other data transfer operations over the same communication bus.

It is therefore a principal object and feature of the present invention to provide a method for DMA operations and storage accesses on other I/O interconnection media between devices wherein a device can specify storage areas at the other device without having actual knowledge of storage addresses involved in the transfer at the other device.

It is a further object and advantage of the present invention to provide a method for DMA operations and storage accesses on other I/O interconnection media to be conducted continuously, intermittently, or sequentially interleaved with other transfer operations over the same communications bus.

Other objects and advantages of the invention will become apparent from the following specification and claims, and with reference to the drawings.

DESCRIPTION OF THE PREFERRED EMBODIMENT

Figure 1:
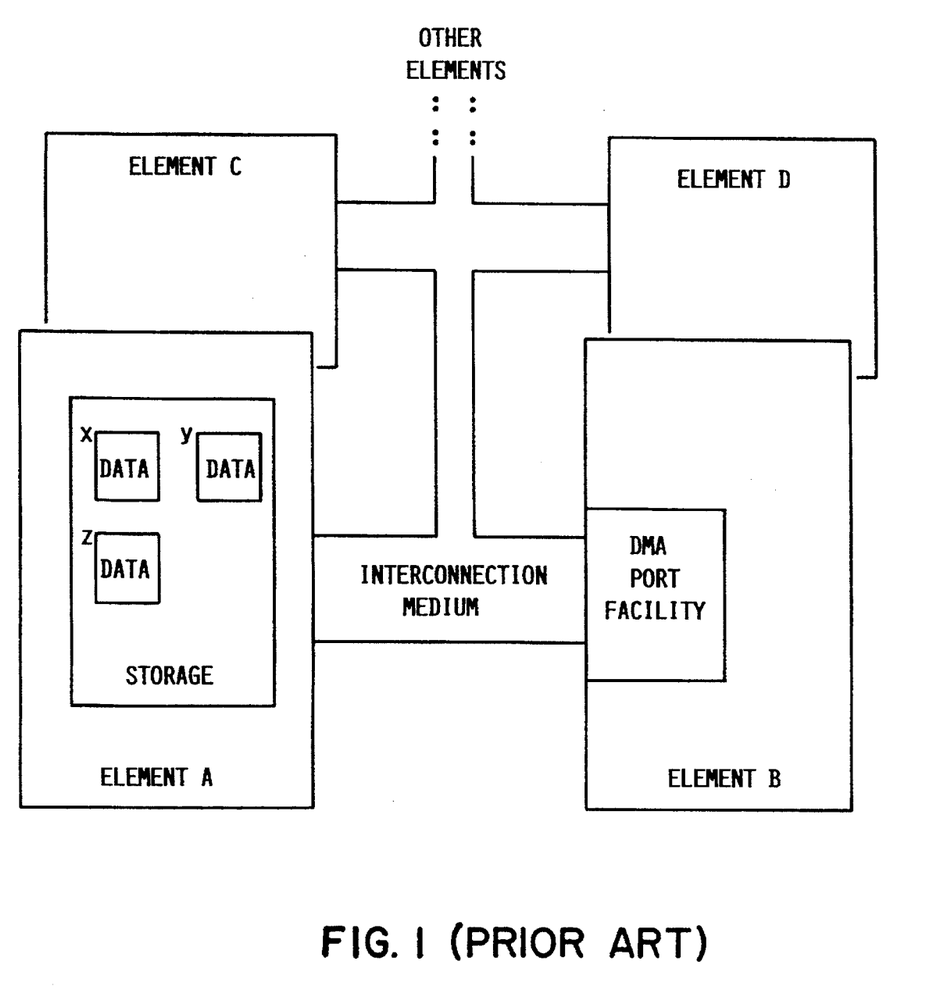
FIG. 1 shows a symbolic representation of prior art DMA interconnections.

Referring first to FIG. 1, an example of the interconnection medium for DMA operations according to the prior art is illustrated. Element B contains a DMA port facility by which it performs DMA to the storage of element A, and the data that is transferred between element A and B using the DMA protocol is dispersed through discontiguous regions "X DATA," "Y DATA," and "Z DATA" within the storage of element A. For this DMA transfer to occur, element B must have explicit knowledge of each such storage region within element A to effect the complete transfer of all data between elements A and B using direct memory access to the storage of element A. This illustrates one of the disadvantages of the prior art; namely, that the DMA port facility within element B must be implemented specifically with knowledge of the storage architecture of element A, and element B must be informed of the specific physical organization within element A's storage of any data to be transferred between elements A and B.

Figure 2:
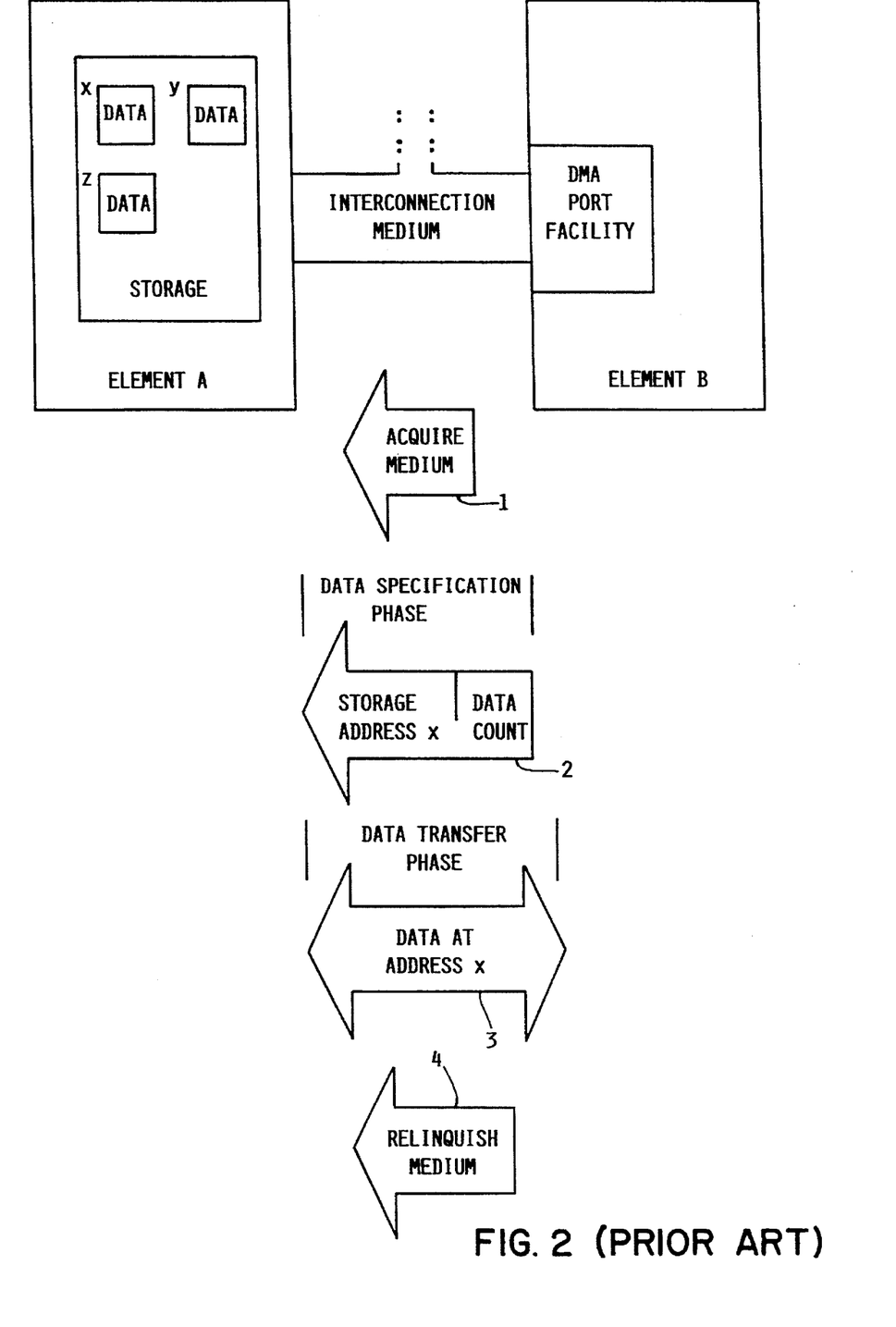
FIG. 2 shows prior art data specification and transfer phases of a DMA operation.

An additional characteristic of the prior art is shown in FIG. 2. The specification of the storage location of data within one or both communicating elements must be synchronous with respect to the transfer of the data associated with these storage locations over the interconnection medium. FIG. 2 illustrates the DMA protocol characteristic of the prior art. A DMA port facility within element B acquires control of the interconnection medium for the purpose of DMA to the storage within element A at step 1. Having thus established a dedicated communications path between elements A and B on the interconnection medium, the DMA port facility next enters the data specification phase, by presenting a storage address to the interconnection interface at element A, and possibly a count of the quantity of data to be transferred, beginning at that storage location; this occurs at step 2.

Having thus specified the storage location within element A that is the subject of the data transfer, the DMA port facility within element B proceeds to the data transfer phase of step 3. In this phase, element B proceeds to transfer data between element B and the specified storage location within element A, according to the specific protocol of the interconnection medium. When the specified quantity of data has been transferred, the DMA port facility within element B then enters step 4, wherein it relinquishes the communications path on the interconnection medium between elements A and B. This step allows other elements attached to the interconnection medium to communicate, and the example illustrates the synchronous relationship of the data specification and data transfer phases of a DMA operation within the prior art.

The disadvantage of the synchroneity is a loss in utilization of the interconnection medium whenever there is a latency period between the data specification and data transfer phases of the DMA operation that is significant with respect to the signaling band width of the interconnection medium. Such latencies introduce an idle period on the interconnection medium that reduces its utilization both within the scope of the present DMA operation, and overall, in that other elements sharing that medium may not utilize the medium during this period. This latency may be a consequence of the internal processing and storage access during the data specification phase at the target element (element A), or a consequence of propagation delays of the data specification or data itself on the interconnection medium.

Figure 6A:
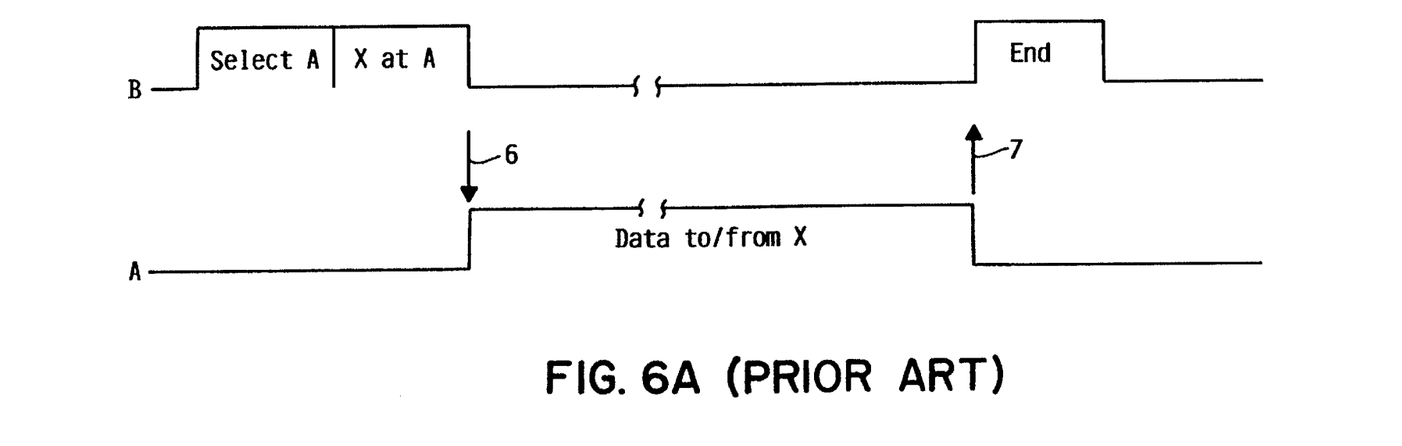
FIG. 6A shows an example of prior art utilization of a DMA bus.

FIG. 6A shows an example of the utilization of a DMA bus resulting from a transfer of the type described above, and with reference to FIGS. 1 and 2. After element B acquires the DMA medium, it transfers to element A a storage address within element A and some form of indicia to identify the number of data blocks to be transferred. Upon receipt of this information, the data transfer phase of the DMA operation may proceed, as illustrated by arrow 6 on FIG. 6A. The latency time required to initiate this phase is a function of the time required by element A to recognize the referenced storage location, and the time required by element A to internally initiate the data transfer to or from storage location X. Thereafter, the data transfer to or from storage location X proceeds for so long as is required, and at the completion of the data transfer control is transferred back to element B at the time indicated by arrow 7 on FIG. 6A. Element B then relinquishes control over the DMA bus. This sequence is repeated for each DMA access, as for example the transfer of data at storage location Y and the transfer of data at storage location Z within element A. It is apparent that, for each data block transfer, the utilization of the DMA bus is synchronized between elements A and B, and the DMA bus is entirely occupied by the transfer operation, to the exclusion of any other devices connected to the DMA bus.

The present invention alleviates both of these disadvantages in the prior art characterizing DMA protocols, by describing an alternate means of data specification in which the DMA port facility does not require explicit knowledge of either the storage architecture or the data organization within the target element of a DMA operation. Secondarily, the present invention describes the data specification and data transfer phases of the DMA operation such that each may proceed as a discrete operation on an interconnection medium asynchronous to the other. This asynchronism allows higher utilization of the interconnection medium data transfer phases, and by allowing the communicating elements to interleave the data specification and data transfer phases of multiple operations. Both of these functions serve to overcome large propagation latencies.

Figure 3:
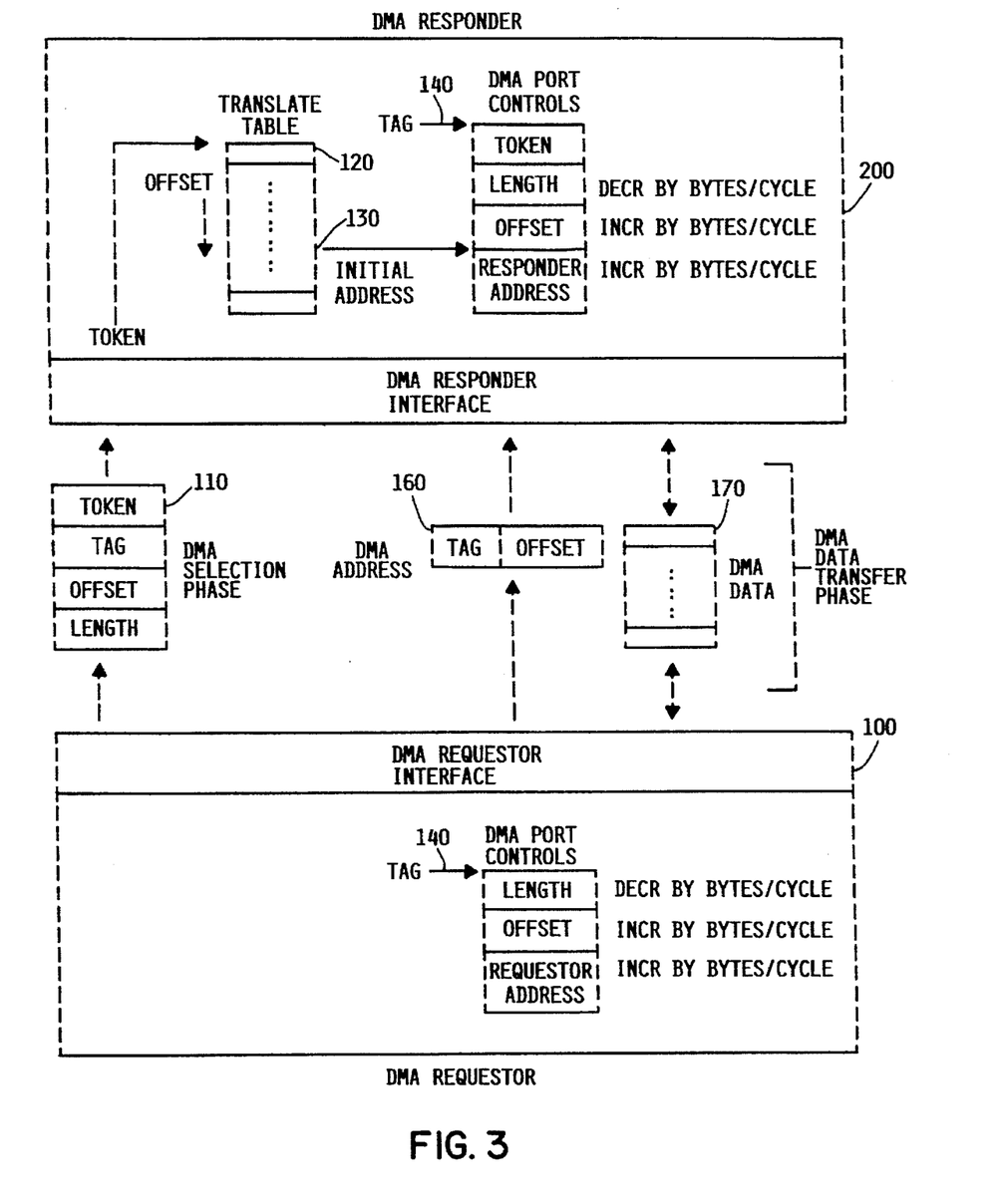
FIG. 3 shows an example of a request/response control block according to the invention, together with the addressing and data transfer techniques.

FIG. 3 shows the logical construct of the invention with respect to DMA transfers between two processors via a DMA bus. For purposes of this explanation, processor 100 is designated as a "DMA requestor," and processor 200 is designated as a "DMA responder." It is to be understood that at any given time, either processor may be a DMA requestor and the other, a DMA responder. The logical construct which is illustrated presumes that the DMA requestor initiates a DMA operation for the transfer of data from the DMA responder to the DMA requestor via their respective interfaces, and via an interconnecting DMA bus. In this example, the DMA requestor does not transmit actual storage addresses on the DMA bus to the DMA responder, but instead transfers logical buffer references labeled by data tokens. This eliminates the need for the DMA requestor to know the DMA responder's addressing architecture and specific data addresses. The translation of the logical buffer references into real storage addresses occurs within the DMA responder, and therefore allows the responder to validate and authorize storage accesses.

This example illustrates a key advantage of the present invention, in that the DMA requestor does not need to know the DMA responder's storage architecture, nor the physical organization of the data within the DMA responder's storage. For example, at the time a DMA operation is initialized, the DMA responder commonly generates a table, or mapping, of the data to be transferred. This mapping specifies the actual storage addresses, within the DMA responder's storage, of the data in terms of the DMA responder's storage architecture. If, for example, the DMA responder's storage architecture is of the form generally characterized as "segmented," in which a storage address consists of a base segment address and an associated byte offset within that segment, the prior art requires that the DMA requestor have full knowledge of this responder architecture. In the prior art, the DMA requestor must know both the mapping scheme of the data within the responder's storage, i.e., which data bytes are at which segment and offset locations, and the DMA requestor must be able to manipulate the segmented storage addresses of that responder's storage in order to access the requested data by DMA. The present invention relieves the DMA requestor of the need to know either the responder's data mapping or storage architecture, because of the present invention's use of the token and offset as a logical buffer reference.

A DMA specification protocol is required, whereby the DMA requestor transfers selection information 110, comprising a "token," a "tag," an "offset," and a "length." The token is merely a logical name for the storage access which the DMA requestor desires to make. The DMA responder supplies this token to the DMA requestor prior to the DMA transfer operation, or the requestor has implicit knowledge of which token to use. The DMA responder receives the token and makes reference to an internal data buffer table or translation table 120, to translate the token to a specific responder storage location. The DMA responder receives the offset as an incrementing value, to select a beginning storage transfer location 130 which is offset from the initial location defined by the token. The DMA responder receives a tag translation as an index or pointer 140 which enables it to associate the incremental offset 160 with the particular DMA responder data buffer table or translation mechanism. The tag also identifies to both the requestor and responder, during those data transfer phases that are asynchronous to the DMA selection phase, the data associated with the requestor's initial selection information. The DMA responder receives the length identifier as an indication of the total number of bytes to be transferred from the selected locations, which defines the final address of data transferred from the responder.

After the DMA selection information has been processed, the DMA requestor sends a DMA address 160 comprising a tag and offset value to the DMA responder. The DMA responder associates the tag with the previously-received identifier 140, and the offset with the previously received offset, which points to a particular real address. The DMA responder transfers the data 170 beginning at that real address to the DMA requestor. The data may be transferred during one or more DMA cycles, but for each cycle both the DMA responder and the DMA requestor decrement the length value corresponding to the number of bytes which have been transferred. Both the DMA requestor and responder also increment the offset value corresponding to the number of bytes transferred, and both increment their respective real internal addresses in coincidence with the number of bytes being transferred. The incrementing of the DMA responder real address is wholly accomplished within the DMA responder, and without communicating the incremented address with the DMA requestor. Similarly, the incrementing of the DMA requestor internal real address is wholly accomplished by the DMA requestor without communication of the incremented address with the DMA responder. The DMA responder recognizes that the data transfer operation has been completed when it has decremented the length value to zero, and it then terminates the DMA operation.

Figure 6B:
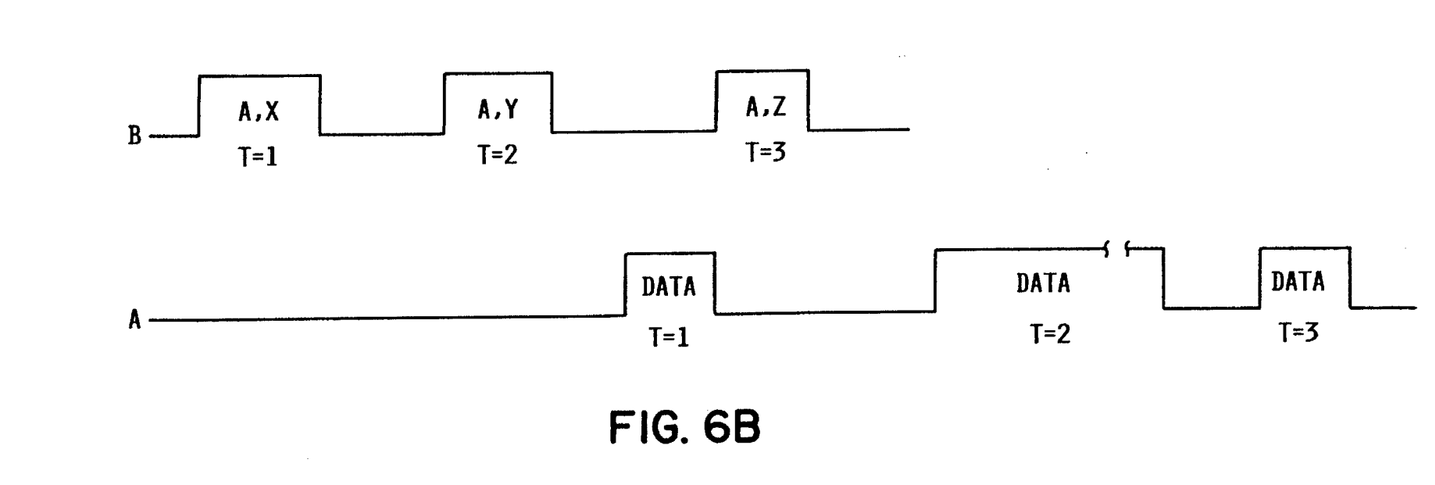
FIG. 6B shows an example of DMA bus utilization according to the invention.

The improved utilization of the DMA bus is shown in FIG. 6B, wherein element B (DMA requestor) sends a DMA address A, X with a tag T (T=1), and may subsequently send a different DMA address A, Y with a new tag (T=2), and may subsequently send a different DMA address A, Z, with a new tag (T=3). The DMA addresses may be sent at any time the DMA bus is available for transmission. Subsequently, element A (DMA responder) retrieves the data represented by A, X, particularly represented by the tag (T=1) and transmits this data over the DMA bus, identifying the data to the requestor using the tag (T=1). At some later time, element A assembles the data for T=2 and sends this data over the DMA bus, identifying the data to the requestor using the tag (T=2). Subsequently, element A assembles the data for T=3 and sends this data over the data bus, identifying the data to the requestor using the tag (T=3). The order in which the responder transmits the data for tags T=1, T=2, and T=3, may differ from that in which the requestor transmitted the associated selection information. The advantages of this DMA bus utilization over the prior art utilization shown in FIG. 6A are apparent.

Figures 4, 5:
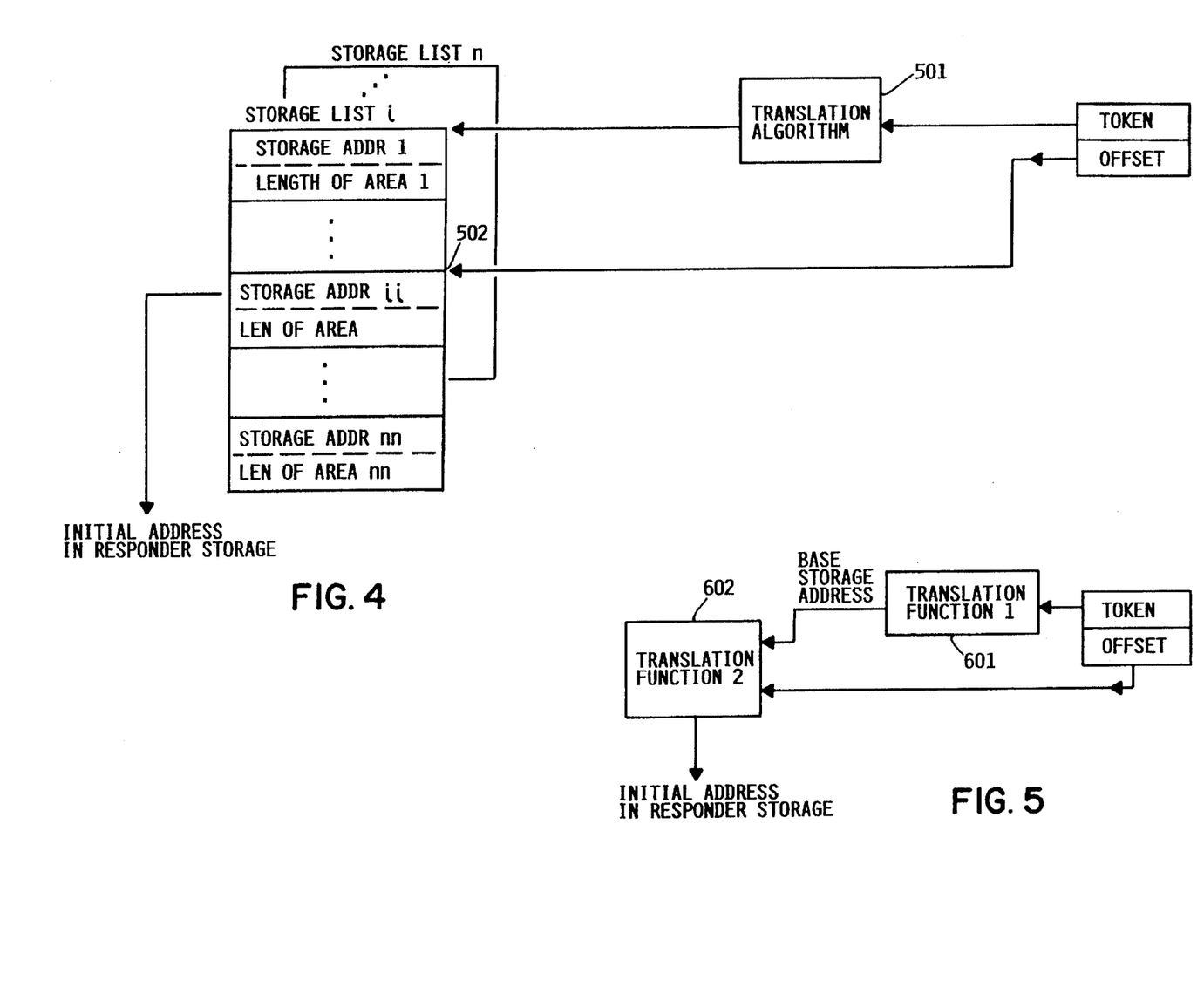
FIG. 4 shows an example of a DMA operation according to the invention.
FIG. 5 shows a further example of a DMA operation according to the invention.

FIG. 4 shows a diagram illustrating one form of implementing the present invention within a DMA responder. In this case, the token is processed by a translation algorithm 501, which selects an internal responder storage list "i" from "n" possible lists. The internal storage list "i" contains a number of references to storage access areas, each one identified by an initial storage address and a value indicating the length of the storage area. The offset value is used directly by the responder to select the initial byte offset 502 within the data represented by the selected storage list "i," and thereby references a specific entry within the storage list "i." This specific entry is then utilized by the responder to identify the initial real address within the responder storage for actual transfer of data. The initial byte offset 502 will not necessarily correspond to the first byte of a storage area designated by an entry in storage list i. It will be understood by those skilled in the art that an additional step will be applied in this case, to select the correct initial storage address within the referenced area, corresponding to the offset value.

FIG. 5 shows a second implementation of the present invention. In this example, the token is translated by an algebraic translation function 601 to calculate a base storage address value. The base storage address value is coupled to an algebraic translation function 602, which also receives the offset value. The algebraic translation function 602 combines the received base storage address with the offset value to calculate an initial real address in responder storage for the DMA operation.

Variations of the foregoing examples will readily become apparent to those skilled in the art, to meet particular needs and purposes. In its broadest context, the operation of the invention can comprise a method and apparatus whereby a sending unit and receiving unit in a DMA operation can perform accesses to one another's memory without knowledge of the associated addressing model. The parties in the DMA operation agree upon an operational addressing model that is mappable to the internal and local addressing models that may be different at each end. The operational model supports operations that require or cause or support linearly-progressive addressing, contiguous block addressing, discontinuous or scattered addressing, and concurrent addressing of separate memory units.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. An apparatus for direct memory addressing via a direct memory access bus connected between a requestor device and responder device, comprising:

a) means for identifying a particular direct memory transfer operation in said requestor device and, in association therewith, means for creating a token value and an offset value in said requestor device, and means for creating a tag identifier in said requestor device, identified to said token value and offset value;

b) means for communicating said token value, said offset value and said tag identifier directly to said responder device, said responder device and said requestor device requiring no knowledge of the other's storage architecture or data organization, and means for recording said token and offset values in said responder device at a location identified by said tag identifier; and c) means for selecting a local address in said responder device by using said token value and said offset value, and means for initiating said particular direct memory transfer operation by said requestor device transmitting said tag identifier directly to said responder device.

2. The apparatus of claim 1, further comprising means for incrementing said selected local address with each subsequent direct memory access transfer in said particular direct memory transfer operation.

3. The apparatus of claim 1, wherein:

said direct memory access bus is a fiber-optic interconnection medium.

4. A method of transferring data in a direct memory access (DMA) operation or on an input/output (I/O) channel or other interconnection medium between a requestor and responder device, comprising the steps of:

a) initially communicating at least one logical token value directly between a requestor and responder, said requestor and said responder requiring no knowledge of the other's storage architecture or data organization, said at least one logical token value identifying a particular data transfer operation which may subsequently occur between said requestor and responder;

b) the requestor initially creating a tag identifier uniquely designating one of said at least one logical token value, and an offset value; and the requestor communicating said tag identifier and the uniquely designated logical token value and the offset value directly to the responder; and the responder storing the tag identifier to associate it with said uniquely designated logical token value and said offset value;

c) the requestor and responder each independently designating a respective first local memory address to associate with each of said at least one logical token value;

d) the requestor transmitting said tag identifier directly to the responder at the start of a DMA transfer operation which is part of said data transfer operation;

e) the responder utilizing the tag identifier to select said uniquely designated logical token value and said offset value and transforming said logical token value and said offset value into a responder second local memory address; and f) the requestor and responder directly transferring data between the requestor and responder, said data being transferred to/from respective local memory addresses designated by said at least one logical token value and said offset value, the first transfer being directly between the requestor first local memory address and the responder second local memory address.

5. The method of claim 4, wherein the step of the responder transforming the logical token and offset values further comprises transforming the logical token value in a translation algorithm to produce a memory address list identity, and transforming the offset value to produce a particular memory address identity in said memory address list.

6. The method of claim 4, wherein the step of the responder transforming the logical token and offset values further comprises transforming the logical token value in a first translation function to produce a first base memory address, and transforming the offset value in a second translation function to produce, in combination with said first base memory address, an initial memory address in said responder local memory.

7. The method of claim 4, further comprising the steps of:

communicating more than one of said logical tokens in a first sequence, each of said logical tokens identifying a particular one of a plurality of data transfer operations, directly between a requestor and a responder; and transferring data in each respective one of said particular data transfer operations directly between said requestor and said responder in a second sequence different from said first sequence in which said responder initially communicated said logical token identified with said particular data transfer operation directly to said responder.

8. The method of claim 4, further comprising the step of:

transferring data directly between said requestor and said responder on a fiber-optic interconnection medium.

9. A method of direct memory addressing between a requestor device and a responder device, comprising;

the requestor device creating a token value, a tag identifier, an offset value and a length identifier and directly communicating the same to said responder device; said requestor device and said responder device requiring no knowledge of the other's storage architecture or data organization, said responder device transforming said token value and offset value into a first local responder memory address; said responder device decrementing said length identifier into a final local responder memory address; said responder device recording said token value, said offset value, and said length identifier at a responder recording memory location; and said responder device using said tag identifier in subsequent transfers of data directly between said requestor device and said responder device to identify said responder recording memory location.

10. The method of claim 9, wherein said transfers of data directly between said requestor device and said responder device occur on a fiber-optic interconnection medium.

11. A method of transferring data between respective memory addresses in a requesting device and a responding device wherein the requesting and responding devices each have memory addressing models unknown to the other, comprising the steps of:

a) communicating a logical token value directly between said requesting device and said responding device, said requesting device using said logical token value to identify a first requesting device memory address, and said responding device using said logical token value to identify a first responding device memory address;

b) said requesting device initiating the transfer of data directly between said requesting device and said responding device by transmitting said logical token value and an offset value directly to said responding device;

c) said responding device, in response thereto, identifying a second responding device memory address corresponding to said first responding device memory address incremented by said offset value; and d) transferring data directly between said second responding device memory address and said first requesting device memory address.

12. The method of claim 11, wherein the step of said requesting device communicating said logical token value further comprises transmitting a tag value to said responding device; and further comprising the step of said responding device associating said tag value with all subsequent data transmissions defined by said logical token value.

13. The method of claim 12, further comprising multiple data transmissions directly between said requesting device and said responding device, each of said data transmissions including transmission of said tag value.

14. The method of claim 13, further comprising the steps of:

communicating more than one logical token value in a first sequence, each of said logical token values identifying a respective one of said multiple data transmissions directly between said requesting device and said responding device; and transmitting said multiple data transmissions directly between said requesting device and said responding device in a second sequence different from said first sequence in which each of said logical token values were initially communicated directly between said requesting device and said responding device.

15. The method of claim 4, wherein said step of:

transferring data directly between said second responding device memory address and said first requesting device memory address is on a fiber-optic interconnection medium.

16. An apparatus for completing a data transfer operation between a requesting device and a responding device wherein each of the requesting device and responding device has a memory address model unknown to the other device, and each of the requesting device and responding device has local memory addresses for such data transfer but such local memory addresses are respectively unknown to the other device, comprising:

a) means for communicating directly between the requesting device and the responding device a logical token value representative of the data to be transferred;

b) means for the requesting device to identify a tag value representative of the identity of the data transfer operation;

c) means for the requesting device to communicate directly to the responding device, at the start of a data transfer operation, the logical token value and the tag value;

d) means for the responding device to initiate said data transfer operation with reference to its local memory addresses corresponding to said logical token value, and means for said responding device to directly transmit said data in one or more sequential segments, each segment being accompanied by said tag value, to said requesting device; and e) means for said requesting device to read said tag value and thereby to associate each segment with one or more requesting device local memory addresses.

17. The apparatus of claim 16, further comprising means for the requesting device to communicate an offset value directly to the responding device; and means for the responding device to initiate said data transfer operation directly between said requesting device and said responding device with reference to its memory address corresponding to said logical token value as incremented by said offset value.

18. The apparatus of claim 16, further comprising:

a fiber-optic interconnection medium directly interconnecting said requesting device and said responding device over which communication of said logical token value, said tag value, and said data transfer operation occurs.

19. The apparatus of claim 16, further comprising:

means for communicating more than one logical token value in a first sequence, each logical token identifying a particular data transfer operation, directly between said requesting device and said responding device; and means for undergoing more than one particular data transfer operations between said requesting device and said responding device in a second sequence different from said first sequence in which said responding device initially communicated said logical token value identified with said particular data transfer operation directly to said responding device.

20. An apparatus for performing a plurality of direct memory addressing operations between a requestor device and responder device wherein each device has a memory address model unknown to the other device, and each device has respective local memory addresses for data transfer in said direct memory addressing operations, comprising:

a) means for designating a plurality of logical tokens and offset values, one token and one offset value associated with each respective one of said plurality of direct memory addressing operations, said logical tokens and said offset values recognizable by said requestor device as an indicia to identify one of a plurality of local memory addresses in said requestor device for performing said plurality of direct memory addressing operations;

b) means in said requestor device for transmitting said each of said logical tokens and offset values directly to said responder device in a first sequence on a fiber-optic interconnection medium, and means in said responder device for selecting a plurality of local memory addresses corresponding to each respective one of said logical tokens and offset values;

c) means for initiating one of said direct memory addressing operations in said requestor device and means for designating a tag value as an indicia to identify each respective one of said direct memory addressing operations, including means for communicating said tag value directly from said requestor device to said responder device on said fiber-optic interconnection medium;

d) means in said responder device for performing each of said direct memory addressing operation in unsynchronized sequential segments in a second sequence different from said first sequence, each segment being transmitted directly from said responder device to said requestor device with said tag value, from each respective one of said local memory addresses identified by each respective one of said logical tokens and offset values; and e) means in said requestor device for identifying each respective one of said direct memory addressing operations by said transmitted tag value, and means in said requestor device for performing each respective one of said direct memory addressing operations to each respective one of said local memory addresses identified by each respective one of said logical tokens and offset values.

* * * * *